(12) United States Patent
Madden et al.

(10) Patent No.: US 10,055,432 B2
(45) Date of Patent: *Aug. 21, 2018

(54) TOKEN-BASED DATA MANAGEMENT SYSTEM AND METHOD FOR A NETWORK

(71) Applicant: Cameron International Corporation, Houston, TX (US)

(72) Inventors: Thomas M. Madden, Duncan, OK (US); Robert Diederichs, Edmonton (CA); Jerry Yee, Edmonton (CA)

(73) Assignee: Cameron International Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/260,937

(22) Filed: Sep. 9, 2016

(65) Prior Publication Data

US 2016/0378799 A1    Dec. 29, 2016

Related U.S. Application Data

(63) Continuation of application No. 14/207,237, filed on Mar. 12, 2014, now Pat. No. 9,467,514.

(51) Int. Cl.
| | |
|---|---|
| *G06F 17/30* | (2006.01) |
| *H04L 29/08* | (2006.01) |
| *E21B 41/00* | (2006.01) |
| *H04L 12/26* | (2006.01) |

(52) U.S. Cl.
CPC ........ *G06F 17/30309* (2013.01); *E21B 41/00* (2013.01); *H04L 43/0805* (2013.01); *H04L 67/1097* (2013.01); *H04L 67/12* (2013.01); *H04L 67/146* (2013.01)

(58) Field of Classification Search
CPC .......... G06F 17/30309; H04L 67/1097; H04L 43/0805; H04L 67/146; H04L 67/12; H04L 63/0805; E21B 41/00
See application file for complete search history.

(56) References Cited

U.S. PATENT DOCUMENTS

| | | | |
|---|---|---|---|
| 5,632,027 A | 5/1997 | Martin et al. | |
| 6,363,351 B1 | 3/2002 | Moro | |
| 6,985,750 B1 * | 1/2006 | Vicknair | ................ H04W 8/20 370/310 |
| 8,289,852 B2 | 10/2012 | Vivanco et al. | |
| 9,467,514 B2 * | 10/2016 | Madden | ................ H04L 67/12 |

(Continued)

FOREIGN PATENT DOCUMENTS

| | | |
|---|---|---|
| EP | 2498455 | 9/2012 |
| JP | 2006295907 | 10/2006 |

OTHER PUBLICATIONS

Interational Search Report and Written Opinion dated May 29, 2015 issued in corresponding application No. PCT/US2015/019825, 13 pgs.

(Continued)

*Primary Examiner* — Matthew Smithers
(74) *Attorney, Agent, or Firm* — Chamberlain Hrdlicka (57) ABSTRACT

An apparatus, system, and method to manage data within a wireless network includes sending a token from a master device to a slave device, receiving an archive record only with the token at the master device from the slave device, and storing the archive record from the slave device within an archive record database at the master device.

20 Claims, 3 Drawing Sheets

(56) References Cited

U.S. PATENT DOCUMENTS

| | | |
|---|---|---|
| 2003/0217152 A1 | 11/2003 | Kasper, II |
| 2004/0024795 A1* | 2/2004 | Hind ................. G06F 17/30581 |
| 2004/0073567 A1 | 4/2004 | Pelon |
| 2004/0138786 A1 | 7/2004 | Blackett et al. |
| 2005/0125085 A1* | 6/2005 | Prasad ............... G05B 19/0423 |
| | | 700/83 |
| 2006/0140208 A1 | 6/2006 | Couch et al. |
| 2007/0130229 A1 | 6/2007 | Anglin et al. |
| 2007/0229226 A1* | 10/2007 | Soleimani ............. H04W 74/00 |
| | | 340/10.2 |
| 2009/0094294 A1 | 4/2009 | Morris |
| 2010/0082682 A1 | 4/2010 | Kinoshita |
| 2010/0121861 A1 | 5/2010 | Mardsen et al. |
| 2010/0299401 A1 | 11/2010 | Lloyd |
| 2011/0052423 A1 | 3/2011 | Gambier et al. |
| 2011/0161289 A1 | 6/2011 | Pei et al. |
| 2012/0084524 A1 | 4/2012 | Gokhale |
| 2012/0167098 A1 | 6/2012 | Lee |
| 2014/0231075 A1 | 8/2014 | Springett |
| 2014/0234059 A1 | 8/2014 | Thomeer |
| 2015/0271089 A1* | 9/2015 | Tang ..................... H04L 47/522 |
| | | 370/229 |

OTHER PUBLICATIONS

Mirabella et al., "WTB: a Token Based Wireless Communication over 802.11b," IEEE International Symposium on Industrial Electronics, Jul. 2010: pp. 3505-3512.

Wang et al., "Short Paper: Token-based Data Collection Protocols for Multi-Hop Underwater Acoustic Sensor Networks," WUWNet, Nov. 2009: pp. 1-4.

\* cited by examiner

TOKEN-BASED DATA MANAGEMENT SYSTEM AND METHOD FOR A NETWORK

BACKGROUND

Different protection techniques may be used to ensure the safe operation of electrical instruments in hazardous areas. A hazardous area is generally one where flammable gases and/or particles are present, or could be present. Two common protection methods to prevent the accidental ignition of flammable gases or particles include using electrical equipment that is rated as explosion proof and/or intrinsically safe. Explosion proof refers to equipment that is designed to contain an internal explosion resulting from the flammable gases and particulate entering the electronics. This ability to contain an internal explosion prevents subsequent ignition of the surrounding atmosphere. Intrinsic safety requirements are intended to guarantee that instrument operation or failure cannot cause ignition, such as if the instrument is properly installed in an environment that contains explosive gases. This is accomplished by limiting the maximum energy stored in the device in a worst case failure situation. Excessive energy discharge may lead to sparking or excessive heat, which could ignite an explosive environment in which the transmitter may be operating.

Such techniques and tools are highly useful in the process control and measurement industry to allow operators to conveniently communicate with and/or interrogate field devices in a given process installation. Examples of such process installations include petroleum, pharmaceutical, chemical, pulp, and other processing installations. In such installations, the process control and measurement network may include tens or even hundreds of various explosion proof and intrinsically safe field devices. However, communication between one or more devices within a network may be limited, such as by compromising the timeliness or reliability of the communication of data within the network, particularly as an intrinsically safe device within the network may be limited with respect to energy use. Accordingly, it remains a priority to increase the capability of communication with a device, particularly in hazardous environments commonly associated with devices that include explosion proof enclosures and/or are intrinsically safe.

BRIEF DESCRIPTION OF THE DRAWINGS

For a detailed description of the preferred embodiments of the invention, reference will now be made to the accompanying drawings in which.

DETAILED DESCRIPTION

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

Accordingly, disclosed herein is an apparatus, system, and method to manage communications within a network, and in particular within a wireless network at least partially positioned or contained within a hazardous area. The wireless network may include a master device and one or more slave devices in communication with each other. The method includes sending a token from a master device to a slave device, receiving an archive record only with the token at the master device from the slave device, and storing the archive record from the slave device within an archive record database at the master device. In particular, the archive record may only be sent by the slave device and/or received at the master device when accompanied with the token. The method may further include updating the archive record database at the master device with the archive record from the slave device. Tokens may be sent from the master device to one or more slave devices based upon bandwidth available within the network and the number of slave devices in communication with the master device. When archive records are sent to the master device, the archive records may be sent and received at the master device from the slave device in an order from an oldest un-transmitted archive record to a newest un-transmitted archive record. The archive record may be created at the slave device. The slave device may include a flow meter, and the archive record may include data of a flow rate and a property measured by the flow meter. In particular, the slave device may include an embedded flow computer that may take measurements from a flow meter, such as an orifice meter or a turbine flow meter. Further, at least one, if not all, of the master device and the slave devices is positioned within a wellsite, in which the master device includes an explosion proof enclosure and/or is an intrinsically safe device.

Figure 1:
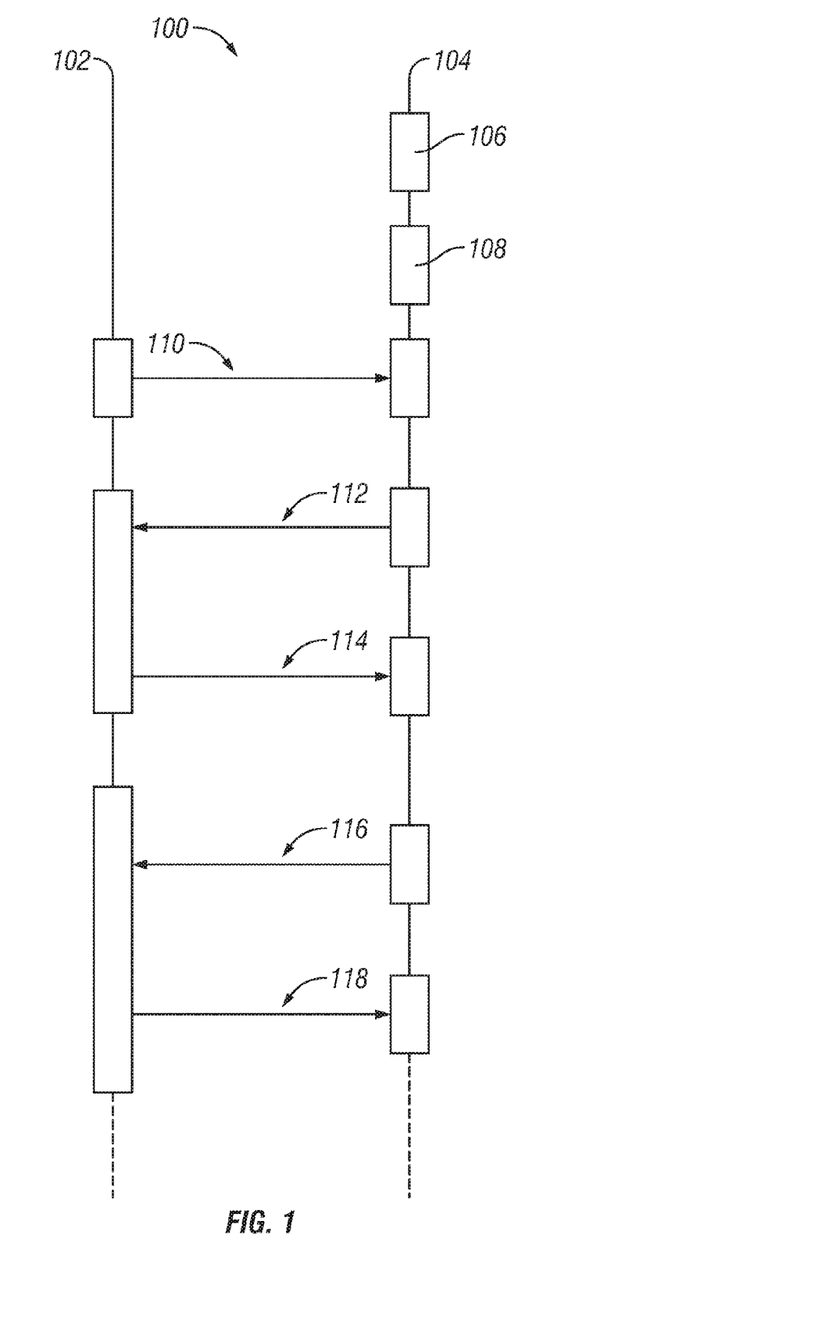
FIG. 1 shows a schematic view of a sequence diagram of an apparatus, a system, and/or a method to manage communications within a network in accordance with one or more embodiments of the present disclosure.

Referring now to FIG. 1, a schematic view of a sequence diagram of an apparatus, a system, and/or a method to manage communications within a network 100 in accordance with one or more embodiments of the present disclosure is shown. The present disclosure may relate particularly to managing communications within a wireless network at least partially positioned or contained within a hazardous area. As shown in FIG. 1, the network 100 may include a master device 102 and one or more slave devices 104 in communication with each other. The master device 102 may have unidirectional control of the slave devices 104, and in one or more embodiments, the master device 102 may be elected amongst a group of two or more devices, with the remaining devices then used as slave devices 102.

A slave device, in addition to a master device, may be used to create one or more archive records. For example, FIG. 1 shows the slave device 104 creating a first archive record 106 and creating a second archive record 108. An archive record may include data recorded by the slave device 104 that may be attributable to a particular location and/or a particular time. In one embodiment, the slave device 104 may include and/or be operably coupled to one or more sensors, such as analog and/or digital sensors. Accordingly, the slave device 104 may include one or more measurements from one or more sensors when creating archive records.

As discussed above, the network 100 may include at least one or more components that are used within a wellsite. As such, a slave device and/or a master device in accordance with one or more embodiments of the present disclosure may include a device to measure one or more properties and/or characteristics of the wellsite, such as a flow meter and/or any other type of measuring device known in the art. In such an embodiment, the slave device may be able to collect one or more measurements related to properties and/or characteristics related to flow through the wellsite. Accordingly, an archive record created by a slave device flow meter may include data of flow rates, such as a volumetric flow rate, a mass flow rate, and/or an energy flow rate. Further, the archive record may include one or more other properties and/or characteristics of the wellsite, such as static pressure, differential pressure, and/or temperature related to the flow rates. The slave device 104 may then create the archive records at predetermined intervals, such as by creating an archive record when a predetermined amount of time has passed and/or when a predetermined event has occurred. For example, in one or more embodiments, the slave device 104 may create archive records on a daily basis, on an hourly basis, and/or on a minute-by-minute basis.

The master device may send one or more tokens to the slave device to enable communication from the slave device to the master device. Accordingly, in FIG. 1, the master device 102 may send two tokens 110 to the slave device 104 with the slave device 104 receiving the tokens. Once the slave device 104 has tokens from the master device 102, the slave device 104 may then send archive records created by the slave device 104 with the tokens to the master device 102. In one or more embodiments, the slave device 104 does not have to immediately send an archive record with the token to the master device 102, and as such, the slave device 104 may hold one or more tokens until an archive record is created and ready to be sent to the master device 102.

The slave device 104 may send and the master device 104 may receive a token along with each archive record. In particular, in FIG. 1, the master device 102 may receive from the slave device 104 the first archive record along with one of the two tokens 112, and the master device 102 may receive the first archive record only with one of the tokens 112 from the slave device 104. In one or more embodiments, an archive record may be received at the master device 104 only when accompanied by or received with a token. This arrangement may enable the network 100 to establish and systematize communication between one or more devices, particularly communication from a slave device to a master device, when bandwidth and resources for facilitating communication between such devices may be limited.

In one or more embodiments, a slave device may not send an archive record to a master device unless accompanied by a token. If a slave device includes multiple archive records to send to the master device, a token may be sent with each different archive record to the master device. Further, if a slave device includes multiple archive records to send to the master device, the slave device may send the archive records to the master device in order from the oldest un-transmitted archive record to the newest un-transmitted archive record. An archive record may be un-transmitted and/or not received if the archive record has not been sent by the slave device or if the archive record has not been received by the master device, such as properly sent or received without any errors. The slave device may then determine, amongst the un-transmitted archive records, which is the oldest, such as which archive record has the oldest time stamp and/or contains information with the oldest date or time of measurement/recordation. With respect to FIG. 1, as the first archive record was created 106 before the second archive record was created 108, the first archive record was then the oldest un-transmitted archive record. Accordingly, the slave device 104 sent the first archive record to the master device 102 after receiving tokens from the master device 102.

After the slave device sends and the master device receives an archive record, the master device may then store the archive record from the slave device within an archive record database at the master device. For example, the master device 102 may store the first archive record received from the slave device 104 within an archive record database at the master device 102. In particular, the master device 102 may update an archive record database stored at the master device 102 with the first archive record received from the slave device 104. In such an embodiment, the first archive record may be stored/saved to replace one or more archive records within the archive record database, and/or the first archive record may be stored/saved as an additional archive record within the archive record database.

Further, in one or more embodiments, the master device and one or more slave devices within a network may synchronize with each other, such as to compare and/or verify if the slave devices have any archive records not sent to the master device. For example, in one embodiment, the master device 102 may have a master device register of the archive records included within an archive record database, and the slave device 104 may have a slave device register of the archive records included within the archive record database. The archive record database for the slave device 104 may include each of the archive records for the slave device 104. Accordingly, in one or more embodiments, the slave device register may include a listing of the archive records included within the archive record database for the slave device 104. The archive record database for the master device 102 may include archive records for the master device 102, may include archive records received from the slave device 104, and/or may include archive records received from any other slave device in communication with the master device 102. Accordingly, in one or more embodiments, the master device register may include a listing of the archive records included within the archive record database for the master device 102.

In one or more embodiments, to synchronize the master device and one or more slave devices within a network, registers of the master device and the slave device may be compared with each other to determine which, if any, archive records have been created by the slave devices that have not been sent, and/or not received, by the master device. As such, with respect to FIG. 1, the master device 102 and the slave device 104 may synchronize with each other 114. The master device 102 may synchronize with the slave device 104 by comparing the master device register of the master device 102 with the slave device register of the slave device 104. When comparing the master device register and the slave device register, the master device 102 and/or the slave device 104 may determine if the slave device 104 has any archive records that have been created and have not been sent to and/or have not been received by the master device 102. Accordingly, the master device 102 and the slave device 104 may determine if a gap exists between the archive record database at the master device 102 and the archive record database at the slave device 104. Further, though the archive record database at the master device 102 and the master device register may include information for the master device 102 and/or other slave devices in communication with the master device 102, the master device 102 in one or more embodiments may compare the information relevant to the slave device 104 in determining if the slave device 104 has any archive records that have been created and have not been sent to and/or have not been received by the master device 102.

In addition to determining if the slave device 104 has any archive records that have not been received by the master device 102, the master device 102 may determine if and how many tokens the slave device 104 may have. In one or more embodiments, the master device may send one or more tokens to the slave device such that the slave device may have a token for each archive record that has not been received by the master device. With respect to FIG. 1, when the master device 102 and the slave device 104 synchronize with each other 114, the master device register and the slave device register may be compared with each other to determine that the slave device 104 has the second archive record that has not yet been sent to the master device 102. The master device 102 may also determine that the slave device 104 still has one token that has not yet been used. Accordingly, the master device 102 may further determine that the slave device 104 has one archive record not yet received by the master device 102 and one token to send the second archive record such that the slave device 104 does not need any further tokens to send the second archive record.

Referring still to FIG. 1, the slave device 104 may send and the master device 102 may receive the second archive record along with the second of the two tokens 116. After the second archive record has been received, the master device 102 and the slave device 104 may compare the master device register with the slave device register again to determine if the slave device 104 has any archive records not received by the master device 102. In this embodiment, as the slave device 104 created and sent both the first archive record and the second archive record, each accompanied with a token, to the master device 102, the master device 102 may determine that all archive records created by the slave device 104 have been received by the master device 102. Further, in this embodiment, the master device 102 may determine that the slave device 104 does not have any further tokens. Accordingly, in such an embodiment, the master device 102 may send one or more additional tokens 118 to the slave device 104 such that the slave device 104 may send an archive record, once created, with each token back to the master device 102.

In accordance with one or more embodiments of the present disclosure, the master device within the network may send and distribute one or more tokens to one or more slave devices based upon one or more factors, such as bandwidth available within the network and the number of slave devices in communication with the master device. In one embodiment, as the number of slave devices increases, the number of tokens sent between the master device and each particular slave device may decrease. For example, in a network that doubles the number of slave devices in communication with the master device, each of the slave devices may receive half as many tokens to ensure proper communication between each of the slave devices and the master device. In another embodiment, as available bandwidth increases within the network, the number of tokens sent between the master device and the slave devices may also increase. For example, the master device, the slave device, and/or another component within the network may measure bandwidth unavailable (e.g., used) and/or bandwidth available (e.g., unused) within the network and determine if enough bandwidth is available for the master device to communicate with one or more slave devices. In particular, the device or component may determine if bandwidth available within the network is above a predetermined amount. If the bandwidth available is above a predetermined amount, the master device may send a token to the slave device to enable communication for the slave device to send an archive record to the master device. Further, if the bandwidth available is above other predetermined amounts, such as a second predetermined amount, the master device may send multiple tokens, such as two tokens, to the slave device to enable the slave device to send two archive records to the master device.

In one or more embodiments, one or more of the slave devices within a network, such as each slave device, may determine how much bandwidth is required to communicate with the master device based upon one or more factors, such as: a period at which the slave device is producing real time data; an amount of transmitted archive records; and/or a number of non-synchronized slave structures. The estimated bandwidth may be in terms of transmission time. Within a packet, such as a maintenance packet, sent from the slave device to the master device may be the slave device placing a request for the estimated bandwidth to communicate with the master device. The master device may collect bandwidth requests and, based upon the number of requests and amount of bandwidth requested, may reply to each slave device with a level of granted bandwidth, such as in terms of transmission time. For example, the master device may grant an asymmetrical amount of bandwidth to each slave device, such as to allow selected slave devices to empty any queue of transmissions. When a slave device indicates that no tokens are remaining, the master device may issue additional tokens to the slave device, such as based upon a ratio or proportion of the calculation period from the slave device and the granted bandwidth within the bounds of the minimum and maximum issued tokens. For example, in one embodiment, the minimum amount of issued tokens may be two, and the maximum amount of issued tokens may be twenty. Accordingly, based upon a particular bandwidth need for a slave device, the slave device may receive a proportion of these tokens for communication. The slave devices may then repeat the process, as detailed above, such that any given slave device may release bandwidth that may have been granted when a queue is emptied and/or allocate bandwidth to a different slave device, as needed.

Figure 2:
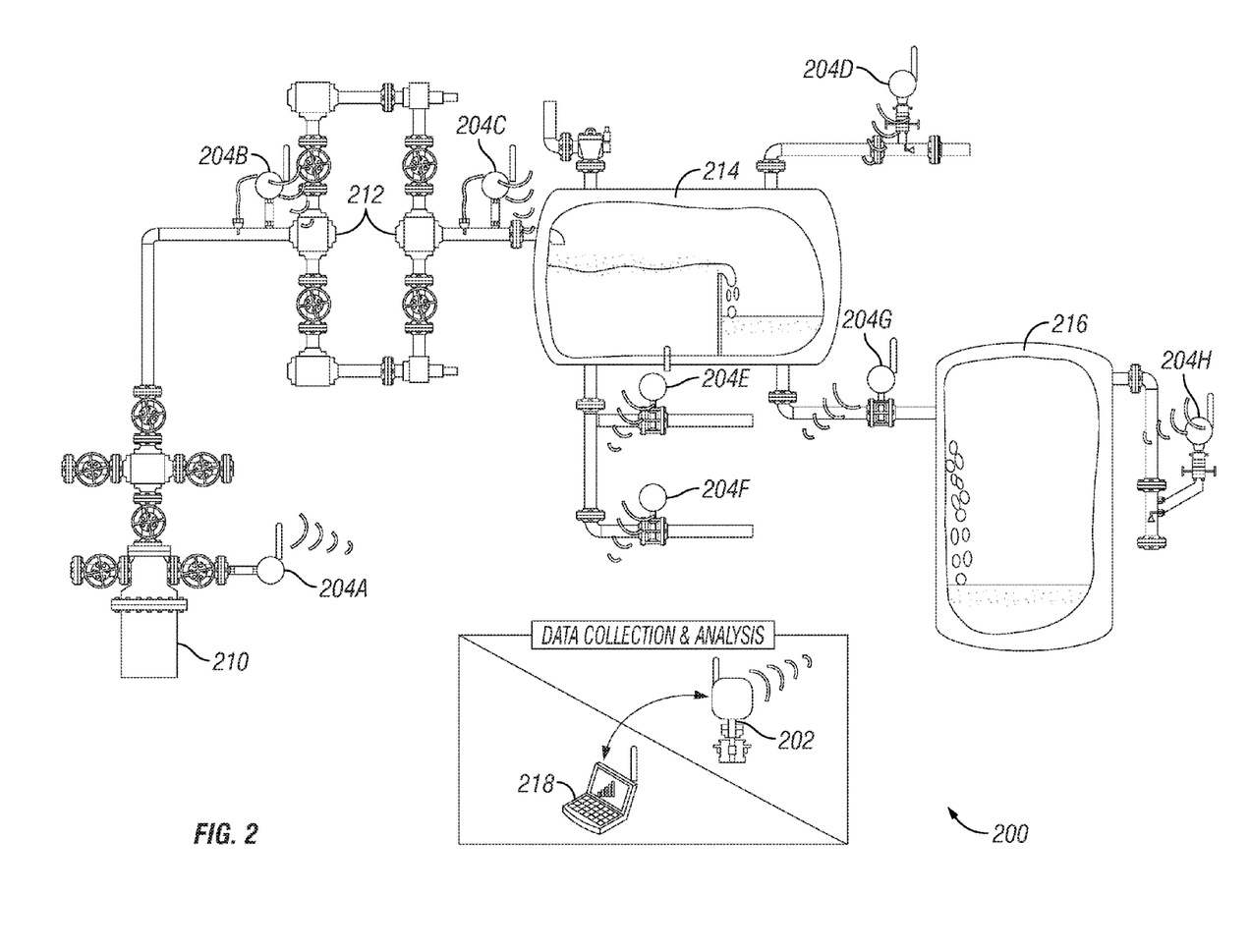
FIG. 2 shows a schematic view of a wireless network in accordance with one or more embodiments of the present disclosure.

Referring now to FIG. 2, a schematic view of a wireless network 200 in accordance with one or more embodiments of the present disclosure is shown. As discussed above, the present disclosure may relate particularly to managing communications within a wireless network at least partially positioned or contained within a hazardous area. Accordingly, one or more components of the wireless network 200 may be included within a hazardous area, such as within a wellsite, as shown.

The wireless network 200 may include a master device 202 with one or more slave devices 204 in communication with the master device 202. As discussed above, the master device 202 and/or one or more of the slave devices 204 may be used as a flow meter and/or any other type of measuring device known in the art to measure one or more properties and/or characteristics of the wellsite. For example, one or more of the slave devices 204 may be able to collect one or more measurements related to properties and/or characteristics related to flow through the wellsite. Accordingly, an archive record created by one or more of the slave devices 204 may include data of flow rates, such as a volumetric flow rate, a mass flow rate, and/or an energy flow rate. Further, the archive record may include one or more other properties and/or characteristics of the wellsite, such as static pressure, differential pressure, and/or temperature related to the flow rates.

As such, with respect to FIG. 2, a first slave device 204A may be used to monitor and measure one or more properties and/or characteristics of a wellhead 210, such as to monitor and measure casing pressure. A second slave device 204B may be used to monitor and measure one or more properties and/or characteristics of material flowing into a choke manifold 212. A third slave device 204C may be used to monitor and measure one or more properties and/or characteristics of material flowing out of the choke manifold 212 and/or into a separator 214. A fourth slave device 204D may be used to monitor and measure one or more properties and/or characteristics of material, such as gas, flowing out of the separator 214. A fifth slave device 204E and/or a sixth slave device 204F may be used to monitor and measure one or more properties and/or characteristics of material, such as water, flowing out of the separator 214. A seventh slave device 204G may be used to monitor and measure one or more properties and/or characteristics of material, such as oil, flowing out of the separator 214 and/or into a surge tank 216. Further, an eighth slave device 204H may be used to monitor and measure one or more properties and/or characteristics of material, such as gas, flowing out of the surge tank 216.

The master device 202 may then be in communication with one or more of the slave devices 204. Further, a computer 218 may be in communication with the master device 202, such as to retrieve information with respect to the master device 202 and/or one or more of the slave devices 204. In such an embodiment, the master device 202 may be positioned within the wellsite, whereas the computer 218 may communicate with the master device 202, such as through a Modbus communications protocol, in a non-hazardous area. Further, one or more of the slave devices 204 may be autonomous such that, independent of the connection status between the master device 202 and the slave devices 204, the slave devices 204 may continue to gather information and data and archive records to later be transmitted to the master device 202.

Figure 3:
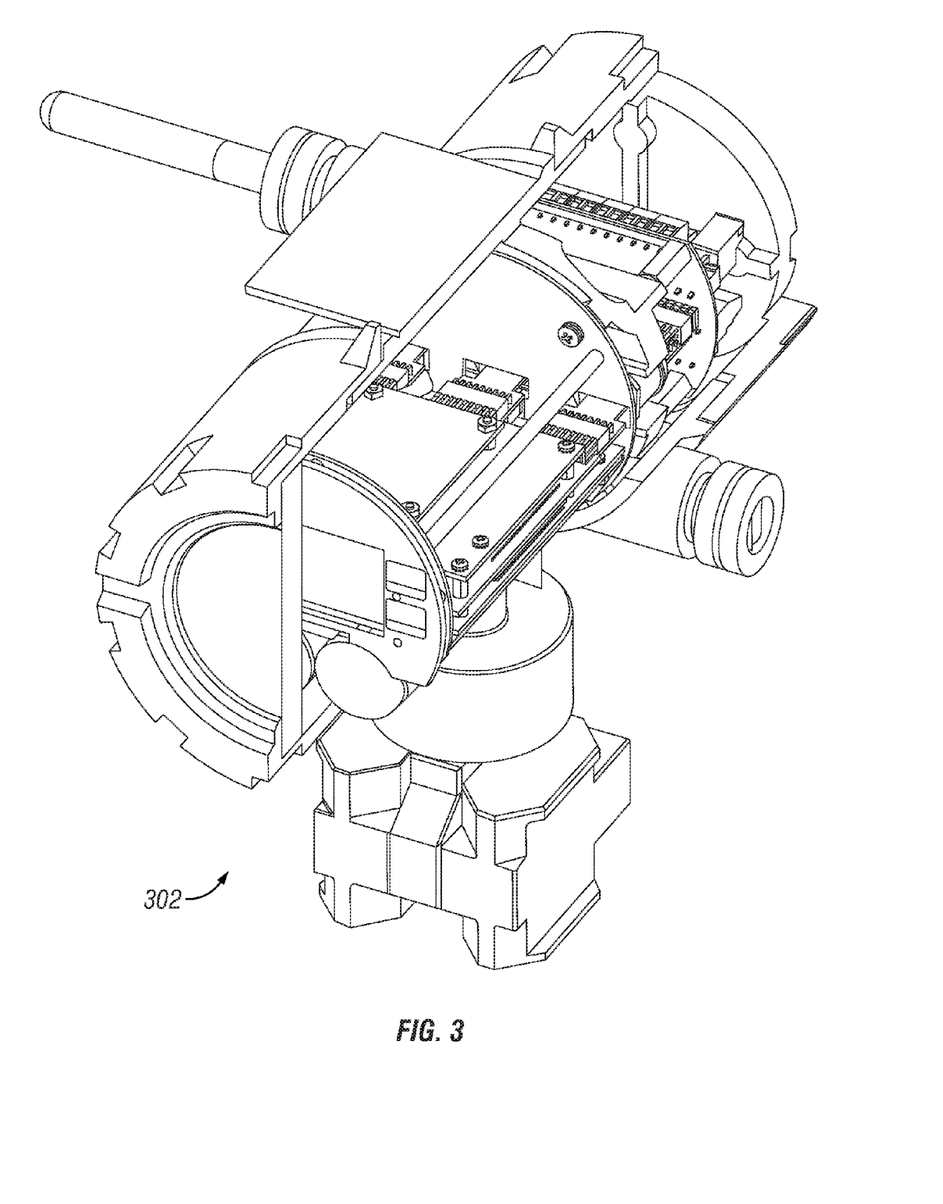
FIG. 3 shows a perspective view of a networked computer system that may be used as a master device in accordance with one or more embodiments of the present disclosure.

Aspects of embodiments disclosed herein, such as sending and receiving an archive record with a token, creating and storing an archive record, and comparing registers, amongst one or more other functions, may be implemented on a specialized computer for use within a hazardous area and/or any type of computer regardless of the platform being used. For example, as shown in FIG. 3, a networked computer system 302 that may be used as a master device in accordance with an embodiment disclosed herein may include a processor, associated memory, a storage device, and numerous other elements and functionalities typical of today's computers. The networked computer 302 may also include input means, such as a touch screen and/or one or more explosion proof buttons, and output means, such as a display. The networked computer 302 may be connected to a local area network (LAN) or a wide area network (e.g., the Internet) via a network interface connection and/or a wireless network connection. Those skilled in the art will appreciate that these input and output means may take many other forms. Additionally, the computer system may not be connected to a network. Further, those skilled in the art will appreciate that one or more elements of aforementioned computer 302 may be located at a remote location and connected to the other elements over a network.

As a network in accordance with the present disclosure may be positioned within a hazardous area, such as within a wellsite, a master device and/or a slave device may be intrinsically safe and/or include an explosion proof enclosure. As such, in accordance with one or more embodiments of the present disclosure, "explosion proof," as used herein, is used in a context consistent with the National Fire Protection Association (NFPA) and the National Electric Code (NEC®), both of which have helped define the term "explosion proof." Definitions for several types of protection techniques acceptable when designing products for use in hazardous (classified) locations include, but are not limited to: explosion proof, dust ignition proof, dust tight, purged/pressurized, intrinsically safe, and hermetically sealed. These definitions set the criteria that must be met by all components installed in hazardous (classified) locations. As such, in accordance with one or more embodiments, to meet the criteria for the explosion proof rating, an enclosure is be able to contain any explosion originating within its housing and to prevent sparks from within its housing from igniting vapors, gases, dust, and/or fibers in the air surrounding it. Therefore, explosion proof, when referring to electrical enclosures, does not mean that it is able to withstand an exterior explosion. Instead, it is the enclosures ability to prevent an internal spark or explosion from causing a much larger blast. Additionally, in one or more embodiments, an explosion proof enclosure is able to meet the temperature requirements of the specific application in which it is to be installed. This means that the operating temperature of the motor (and its enclosure) or other component cannot be greater than the lowest ignition/combustion temperature of the gases or dusts in the atmosphere where the component is to be installed.

An apparatus in accordance with the present disclosure may provide one or more of the following advantages. An apparatus in accordance with the present disclosure may be intrinsically safe such that the apparatus may be used within a hazardous environment. The apparatus as discussed and described above may be limited in the maximum energy stored, power consumption, and/or used with the apparatus to prevent sparking or excessive heat. For example, a data management system of the present disclosure may be capable of consuming only very low amounts of power for extended periods of time.

Those of skill in the art would understand that information and signals may be represented using any of a variety of different technologies and techniques. For example, data, instructions, commands, information, signals, bits, symbols, communications, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Although the present invention has been described with respect to specific details, it is not intended that such details should be regarded as limitations on the scope of the invention, except to the extent that they are included in the accompanying claims.

What is claimed is:

1. A method to communicate within a wireless network comprising physical devices, the physical devices comprising a master device and a slave device, the method comprising:
   determining if bandwidth available within the wireless network is above a predetermined amount at the master device;
   receiving an archive record at the master device from the slave device if the bandwidth available is above the predetermined amount; and
   storing the archive record from the slave device within an archive record database at the master device.

2. The method of claim 1, wherein storing the archive record comprises:
   updating the archive record database at the master device with the archive record from the slave device.

3. The method of claim 1, further comprising:
   comparing a master device register of the archive record database with a slave device register of the archive record database;
   determining if the slave device has any archive records not received by the master device based upon the comparison; and
   sending a token from the master device to the slave device if an archive record has not been received by the master device.

4. The method of claim 1, further comprising:
   sending tokens from the master device to the slave device;
   receiving archive records only with each of the tokens at the master device from the slave device; and
   wherein each of the tokens is accompanied by a different archive record.

5. The method of claim 4, wherein the archive records are received at the master device from the slave device in an order from an oldest un-transmitted archive record to a newest un-transmitted archive record.

6. The method of claim 1, further comprising:
   determining at the master device if the slave device has any tokens; and
   sending a token from the master device to the slave device if determined that the slave device has no tokens.

7. The method of claim 1, further comprising:
   sending a token from the master device to the slave device if the bandwidth available is above the predetermined amount;
   wherein the receiving the archive record comprises receiving the archive record with the token at the master device from the slave device.

8. The method of claim 7, further comprising:
   determining if bandwidth available within the wireless network is above a second predetermined amount; and
   sending a second token from the master device to the slave device if the bandwidth available is above the second predetermined amount.

9. The method of claim 7, further comprising:
   creating the archive record at the slave device;
   wherein the slave device comprises a flow meter;
   wherein the archive record comprises data of a flow rate and a property measured by the flow meter.

10. The method of claim 9, wherein the slave device creates the archive record if the master device and the slave device are not in communication with each other, and wherein the slave device sends the archive record with the token to the master device upon establishing communication between the master device and the slave device.

11. The method of claim 1, wherein:
the wireless network comprises a plurality of slave devices;
at least one of the master device and the plurality of slave devices is positioned within a hazardous area;
at least one of the master device and the plurality of slave devices is positioned within a wellsite; and
the master device comprises an explosion proof enclosure.

12. A non-transitory machine-readable medium to communicate within a wireless network comprising physical devices, the physical devices comprising a master device and a slave device, the medium comprising code, which, when executed by a machine, causes the machine to perform operations, the operations comprising:
determining if bandwidth available within the wireless network is above a predetermined amount at the master device;
receiving an archive record at the master device from the slave device if the bandwidth available is above the predetermined amount; and
storing the archive record from the slave device within an archive record database at the master device.

13. The machine-readable medium of claim 12, wherein the storing the archive record comprises:
updating the archive record database at the master device with the archive record from the slave device.

14. The machine-readable medium of claim 12, wherein the operations further comprise:
comparing a master device register of the archive record database with a slave device register of the archive record database;
determining if the slave device has any archive records not received by the master device based upon the comparison; and
sending a token from the master device to the slave device if an archive record has not been received by the master device.

15. The machine-readable medium of claim 12, wherein the operations further comprise:
sending tokens from the master device to the slave device;
receiving archive records only with each of the tokens at the master device from the slave device; and
wherein each of the tokens is accompanied by a different archive record.

16. The machine-readable medium of claim 12, wherein the operations further comprise:
determining at the master device if the slave device has any tokens; and
sending a token from the master device to the slave device if determined that the slave device has no tokens.

17. The machine-readable medium of claim 12, further comprising:
sending a token from the master device to the slave device if the bandwidth available is above the predetermined amount;
wherein the receiving the archive record comprises receiving the archive record with the token at the master device from the slave device.

18. The machine-readable medium of claim 17, wherein the operations further comprise:
creating the archive record at the slave device;
wherein the slave device comprises a flow meter;
wherein the archive record comprises data of a flow rate and a property measured by the flow meter.

19. The machine-readable medium of claim 18, wherein the slave device creates the archive record if the master device and the slave device are not in communication with each other, and wherein the slave device sends the archive record with the token to the master device upon establishing communication between the master device and the slave device.

20. A method to communicate within a wireless network comprising physical devices, the physical devices comprising a master device and a slave device, the method comprising:
comparing a master device register of an archive record database with a slave device register of the archive record database;
determining if the slave device has any archive records not received by the master device based upon the comparison;
sending a token from the master device to the slave device if an archive record has not been received by the master device;
receiving the archive record with the token at the master device from the slave device; and
storing the archive record from the slave device within the archive record database at the master device.

* * * * *